United States Patent
Haner (10) Patent No.: US 6,888,279 B2
(45) Date of Patent: May 3, 2005

(54) CONTROLLED RELUCTANCE AC INDUCTION MOTOR

(76) Inventor: Lambert Haner, 22555 Center Ridge Rd., Suite 501, Rocky River, OH (US) 44116

( * ) Notice: Subject to any disclaimer, the term of this patent is extended or adjusted under 35 U.S.C. 154(b) by 0 days.

(21) Appl. No.: 10/691,379

(22) Filed: Oct. 22, 2003

(65) Prior Publication Data

US 2004/0080229 A1 Apr. 29, 2004

Related U.S. Application Data

(63) Continuation-in-part of application No. 09/655,576, filed on Sep. 6, 2000, now Pat. No. 6,639,338.

(51) Int. Cl.[7] .......................... H02K 17/16; H02K 17/02
(52) U.S. Cl. ....................................... 310/166; 310/159
(58) Field of Search ................................. 310/159, 166, 310/167, 169, 170, 172

(56) References Cited

U.S. PATENT DOCUMENTS

| | | | |
|---|---|---|---|
| 3,679,953 A | 7/1972 | Bedford | 318/138 |
| 3,775,626 A | 11/1973 | Burgbacher | 310/67 R |
| 4,370,580 A | 1/1983 | Burgbacher | 310/67 R |
| 4,672,286 A | 6/1987 | Williams | 318/798 |
| 4,755,702 A | 7/1988 | Iijima et al. | 310/166 |
| 4,885,497 A | 12/1989 | Hill et al. | 310/265 |
| 5,229,677 A | 7/1993 | Dade et al. | 310/268 |
| 5,861,697 A | 1/1999 | Sugita et al. | 310/166 |
| 6,078,161 A * | 6/2000 | Kim et al. | 318/701 |
| 6,114,789 A | 9/2000 | Pengov et al. | 310/166 |
| 6,626,002 B1 * | 9/2003 | Notohara et al. | 62/228.4 |

OTHER PUBLICATIONS

Nasar, S.A. and Unnewehr, L.E., "Electromechanics and Electric Machines", Second Edition, John Wiley and Sons, 1983 (month unknown), pp. 260–267.

Schmitz, N.L. and Novotny, D.W., "Introductory Electromechanics", Ronald Press, 1965 (month unknown), p. 193.

* cited by examiner

Primary Examiner—Thanh Lam
Assistant Examiner—Judson H. Jones
(74) Attorney, Agent, or Firm—Pearne & Gordon LLP (57) ABSTRACT

An electric motor operated by AC current, that includes a stator and a rotor supported for rotation about an axis relative to the stator. The stator is provided with field windings angularly distributed about the rotor axis and capable of producing a magnetic field vector in the space of the rotor. Circuitry delivers AC current to the windings in a manner that produces an AC magnetic field vector that moves around the axis of the rotor. The rotor has a construction, such as an axially extending conductive loop, that changes its reluctance in the AC magnetic field depending on its orientation to the AC magnetic field vector whereby the rotor is caused to rotate in synchronization with the movement of the AC magnetic field vector.

7 Claims, 10 Drawing Sheets

INVERTER SQUARE WAVE

CONTROLLED RELUCTANCE AC INDUCTION MOTOR

This application is a continuation-in-part of application Ser. No. 09/655,576, filed Sep. 6, 2000, now U.S. Pat. No. 6,639,338.

The invention relates generally to the field of electric motors and specifically to an AC motor with improved performance characteristics.

PRIOR ART

Many types of electric motors are known to the industry. Typically, these known motors have certain desirable characteristics such as high starting torques variable speed and/or high power density. Often, however, a motor with desirable characteristics for a given application has certain disadvantages or deficiencies. These undesirable characteristics often include relatively high cost, electrical circuit complexity, radio frequency or electromagnetic interference, energy inefficiency, limited reliability and/or comparatively short service life.

SUMMARY OF THE INVENTION

The invention provides an AC power operated electric motor that exhibits desirable torque/speed characteristics when operated in an open loop condition and is effectively speed and/or torque controlled with relatively simple and economical electrical circuitry. The motor has a stator with field windings that are energized with alternating current and that, in one embodiment, are arranged to induce an AC current in a conductive loop on a rotor or armature. In various configurations of the motor, the field windings comprise at least two coils angularly displaced from one another around the rotor axis. The positions of the windings in some configurations represent physically or mechanically distinct phases.

The AC stator field is caused to move about the axis of the rotor and, in the aforementioned embodiment, the induced AC field in the conductive loop produces a torque on the rotor causing it to rotate in synchronization with the field rotation. The rotation of the stator field is produced by switching or appropriately modulating AC power to successive angularly displaced field coils.

The motor can be arranged with 2, 4, 6 or even a greater number of even poles and with as many field winding phases as suitable for a particular application. Motor torque, and therefore power, is multiplied in proportion to the number of poles provided in the motor. The motor has open loop speed/torque characteristics approaching the desirable ideal of constant horsepower. These characteristics include high starting torque and high speed at low load.

In another embodiment of the invention, the rotor comprises a cylindrical body formed of magnetic material such as a stack of magnetic silicon steel laminations having a diametral air gap running the axial length of the laminations. The reluctance of the air gap causes the rotor to synchronize its rotation with the rotation of the magnetic field produced by the stator in a manner analogous to that described with the first embodiment. The air gap rotor has the potential of high operating efficiency since there are no substantial $I^2R$ losses associated with currents induced in the rotor. In still another embodiment, the diametral air gap in the rotor can be filled with an electrically conductive non-magnetic plate or body to increase the torque developed in the rotor.

Importantly, the motor lends itself to relatively simple and energy efficient speed control and/or torque control. A standard speed control over a 10:1 ratio is readily achieved. Rated torque can be achieved at zero speed with proper circuitry and therefore the speed range can be from zero to the maximum rated speed. Some of the additional advantages of the motor include low stall current, operation on simple square wave power without difficulty with harmonics, and increased power and/or torque for a given physical size motor as compared to conventional induction motors, for example.

DESCRIPTION OF THE PREFERRED EMBODIMENTS

Figure 1:
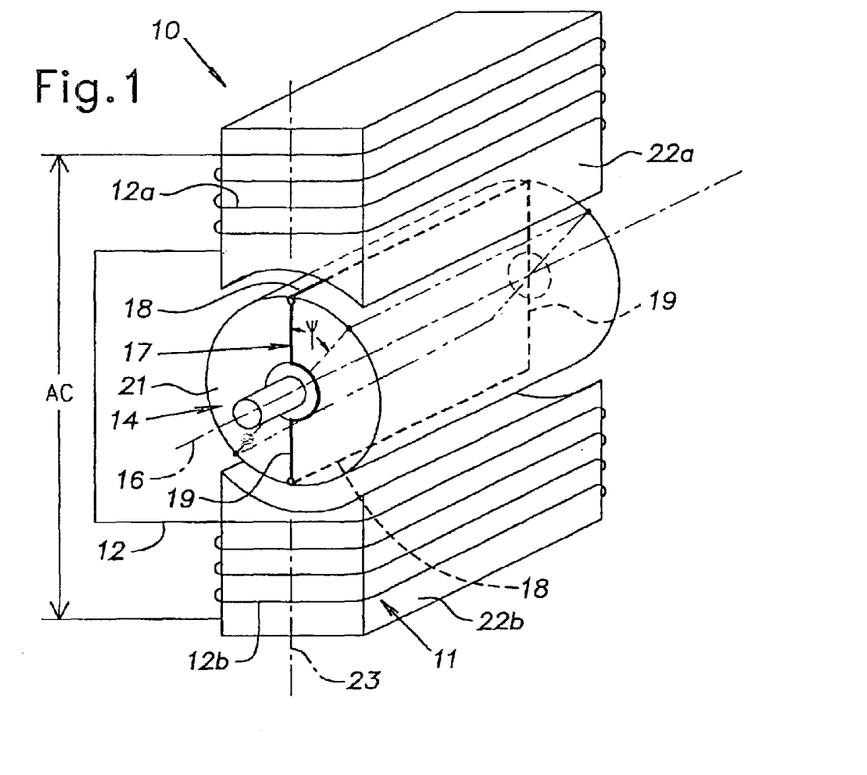
FIG. 1 is a schematic perspective view of a motor illustrating principles of the invention.

Referring now to FIG. 1, a motor 10 has a stator 11 with a field winding 12 and a rotor or armature 14 supported by suitable bearing structure for rotation about an axis 16. The winding 12 is arranged in two sections or portions 12a, 12b on diametrally opposite sides of the rotor 14. The rotor 14 has a conductive loop 17 that has two diametrically opposite portions 18 near the periphery of the rotor that extend parallel to the rotor axis 16 and two end portions 19. A main body 21 of the rotor 14 can be constructed of suitable magnetic silicon steel laminations in a manner known in the art. The two loop portions 18 that extend longitudinally of the rotor lie in a common plane that passes through the rotor axis 16. For purposes of this disclosure, the plane of the conductive loop 17 is taken as the plane of the conductor portions 18. The conductive loop 17, which can be made of copper or aluminum, for example, is electrically continuous; the end portions 19 shunt the longitudinal portions 18. The stator 11 has its field windings 12a, 12b wound about suitable magnetic material such as a stack of magnetic silicon steel laminations 22a and b.

When the field coil or winding 12 is energized with an AC voltage, a magnetic field is created with a vector that is parallel to an axis 23 extending between the windings 12a, b. With the field coil 12 thus energized with an AC voltage, when the rotor 14 is displaced from the illustrated solid line position through an angle ψ magnetic field conditions urge the rotor 14 to return to the solid line position where the plane of the conductive loop 17 is aligned with the field axis 23. That is, the magnetic field conditions urge the rotor 14 to the position where the angle ψ is 0.

Figure 2:
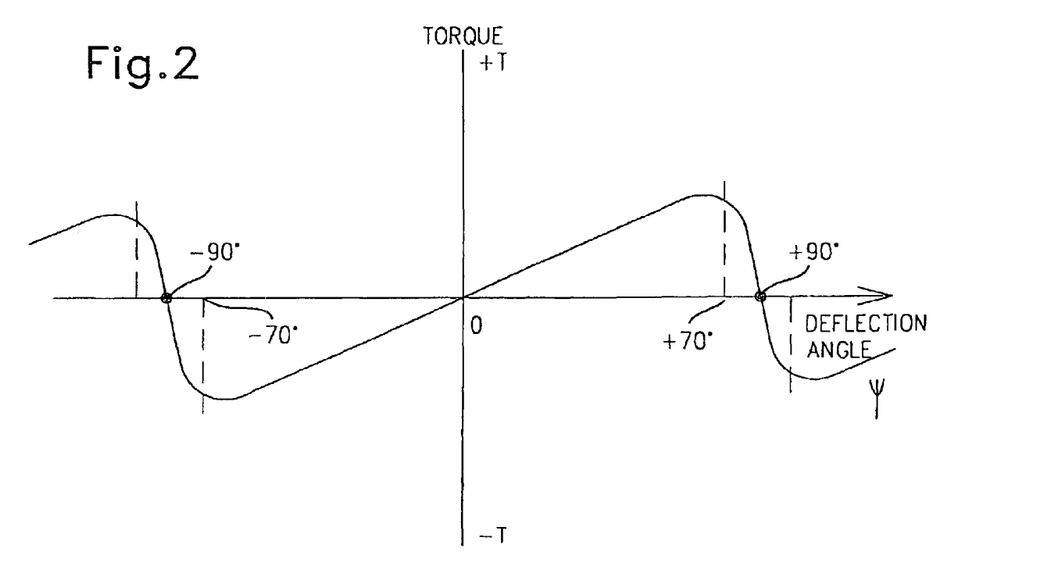
FIG. 2 is a generalized graph illustrating the relationship of torque versus rotor deflection angle for motors constructed in accordance with the invention.

FIG. 2 is a generalized diagram of the relationship between torque and angular displacement ψ. The diagram shows that the torque tending to move the rotor 14 towards the position of alignment with the axis 23 increases proportionately with the displacement or angle ψ. Torque reaches a maximum value at about 70°; at displacements beyond this, the torque diminishes. At ψ equal to 90°, i.e. when the plane of the conductive loop 17 is transverse to the direction of the field vector of the winding 12, the torque reduces to 0. This ψ=90° position can be called a hard neutral while the position at ψ equal to 0 can be called a soft neutral.

When the plane of the conductive loop 17 is turned from alignment with the field vector of the stator 11, i.e. ψ not equal to 0, the AC magnetic field produced by the winding 12 induces an AC current in the conductive loop 17. This rotor current produces its own magnetic field which opposes the stator field. The opposing field produced by the conductive loop 17 increases the reluctance of the flux path of the stator field. It can be shown that in an electromechanical system, such as the motor 10 illustrated in FIG. 1, physical laws work to reduce the reluctance in the system. Consequently, the motor 10 behaves as discussed with the rotor 14 being urged to a position where the plane of the conductive loop 17 is aligned with the axes 23 and the reluctance of the motor system being reduced.

The motor 10 of FIG. 1, as so far described, is not practical as a general purpose rotating motor since it cannot sustain continuous rotation of the rotor. However, the motor's characteristics, as described, are helpful in understanding the operation of other motors, constructed in accordance with the invention, such as those described hereinbelow.

Figure 3:
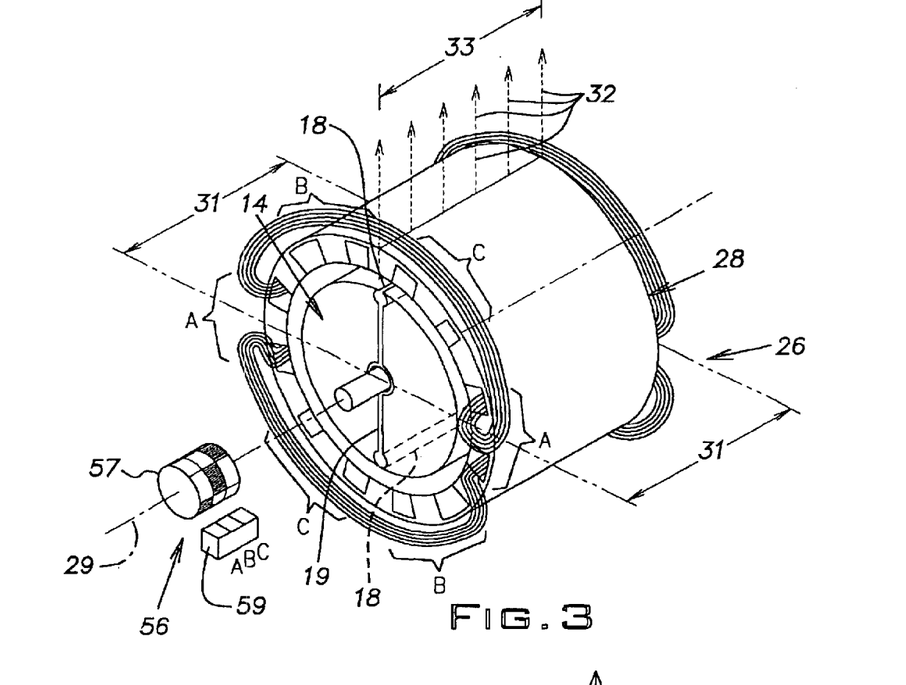
FIG. 3 is a schematic perspective view of a motor constructed in accordance with the invention.

FIG. 3 diagrammatically shows a motor 26 that applies the foregoing principles in a two pole rotor 14, like that described with reference to FIG. 1, but with a three phase stator 28. (The "two pole" designation pertains to the rotor or armature and derives from north and south magnetic poles produced by the conductive loop 17 when the loop is in an AC magnetic field.) The stator 28 typically includes a body formed by a stack of laminations of suitable magnetic silicon steel with internal axially oriented slots 30 distributed about the periphery of the rotor 14 as is generally conventional in motor construction. A winding A has turns wrapped axially around the rotor. The turns include longitudinal or axially oriented portions disposed in the lamination slots 30 on diametrically opposite sides of the rotor 14 and end portions circumferentially looped around the axial projection of the rotor in a manner known in the motor art. The longitudinal portions of the turns of the winding A are geometrically centered on a plane represented at 31 that passes through the rotor axis 16. For clarity, only the winding A is illustrated in FIG. 3 and it will be understood that the other windings B and C are similar in construction. The planes of the windings A, B and C are oriented at 120° relative to one another with reference to the axis 14 of rotation of the rotor 14 and pass through this axis so that adjacent portions of the windings A, B and C are centered at 60° intervals. The winding A, when energized with AC power develops an AC magnetic field vector 32 in a plane 33 perpendicular to the plane 31 of the winding A. The other windings B, C, similarly, produce AC magnetic field vectors perpendicular to their respective planes. The windings A, B and C are thus in a physical or mechanical phase relationship to one another and are electrically isolated from one another. By switching or modulating AC power sequentially to the mechanically phased windings A, B and C, the rotor 14 will be driven in rotation. As explained hereinabove, the rotor 14 will tend to align itself with the field vector of an energized winding (or as discussed later the resultant field vector of simultaneously energized field windings). When the plane of the rotor conductive loop 17 approaches the vector of the field from one energized winding, that winding is de-energized while the adjacent winding in the direction of rotor rotation is energized. By continuing this field switching process, the rotor 14 is caused to rotate continuously.

Figure 4:
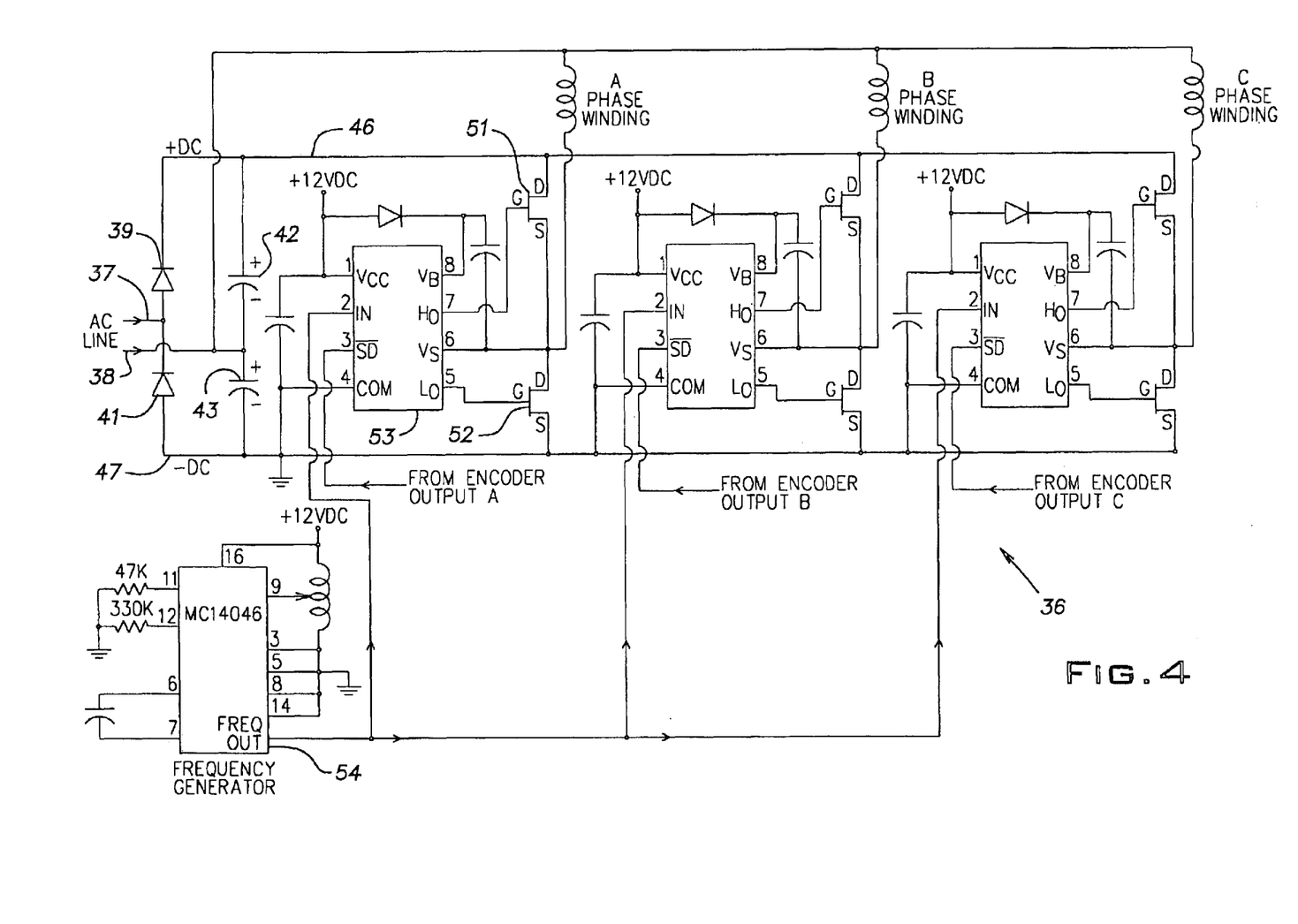
FIG. 4 is an electrical circuit diagram of a controller for the motor of FIG. 3.

FIG. 4 illustrates an example of a circuit or controller 36 suitable for driving the two pole, three winding phase motor 26 of FIG. 3. The motor windings are represented as A, B and C in the circuit of FIG. 4. In the circuit, commercial power, e.g. 60 Hz, 110 volt, single phase power is connected to lines 37, 38. This power is converted to DC in a rectifier and voltage doubler circuit comprising a pair of diodes 39, 41 and capacitors 42, 43. Positive and negative voltages are developed on respective lines or busses 46, 47.

Square wave AC power is supplied independently to each winding A, B or C from paired power mosfet switches 51, 52 associated with each winding. One of the mosfet switches 51 supplies positive voltage while the other 52 supplies negative voltage thereby producing an AC power signal. The mosfet switches 51, 52 are driven by an associated integrated circuit 53 (such as an IR 2104). These drivers 53 are powered by a suitable 12 volt DC source. Each driver 53 alternately operates the associated mosfets 51, 52 at a frequency imposed by a frequency generator 54 (such as an MCI 4046) signaling from its output (pin 4) to an input (pin 2) of each driver 53. The frequency can be any suitable frequency, preferably higher than commercial power of 60 or 50 Hz. A typical frequency can be between 100 to 250 Hz but can be higher if design parameters require such and appropriate materials are used.

A shaft encoder 56 (FIG. 3) of any suitable type and preferably a non-contact type monitors the angular position of the rotor 27 and, therefore, the plane of the conductive loop 17. In the illustrated example of FIG. 3, the shaft encoder 56 senses when a 60° arc on a drum rotating with the rotor 14 associated with each winding A, B or C passes the reference point of a non-rotating part 59 of the encoder fixed relative to the stator 28. The drum 57 of the encoder 56 is divided into three channels, each channel corresponding to one of the field windings A, B or C. The encoder 56 signals the driver 53 of a particular field winding A, B or C when an angular sector on the drum 57 associated with that particular winding is in proximity to the non-rotating part 59 of the encoder. The encoder 56 maintains the signal to the appropriate driver 53 for a time in which a field winding A, B or C develops a relatively large torque on the rotor. This period will be, roughly when the plane of the conductive loop 17 is between 75 and 15° out of alignment with the magnetic field vector of a particular winding (i.e. $75° \geq \psi \geq 15°$).

The time period or, more properly, the angular duration of energization of a particular field A, B or C can be set by the geometry of the codes on the drum 57 of the encoder 56. The drum 57 may be encoded with arcs of detectable material that have a dwell of 60°. This geometry allows each winding, where there are three windings, to be energized twice for each revolution of the rotor 14. While a driver 53 is enabled (i.e. turned on) from a channel of the encoder 56, the driver cycles the associated mosfet switches 51, 52 on and off at the frequency produced by the frequency generator 54. The mosfet switches 51, 52 thereby apply a square wave AC power signal, at the frequency of the generator 54, to the associated field winding A, B or C. With the circuit of FIG. 4 when one of the windings A, B or C is energized the other two windings are inactive.

Figure 5:
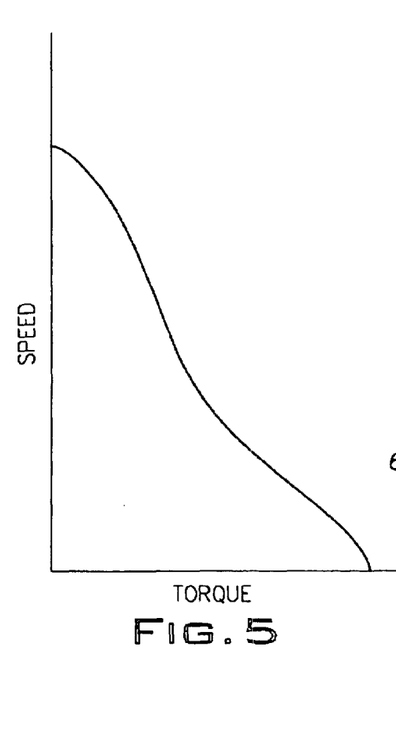
FIG. 5 is a generalized graph illustrating the relationship of speed versus torque of a motor constructed in accordance with the invention.

The motor 26 of FIG. 3, driven by the open loop circuit 36 of FIG. 4 has a desirable speed torque curve schematically illustrated in FIG. 5. It will be seen that the motor 26 approaches a constant horsepower device. Additionally, the motor 26 is characterized by relatively high starting torque and is capable of relatively high speed operation. A motor operating with the principles of the motor 26 discussed in connection with FIGS. 3 and 4 can be constructed with more field windings or field phases. The windings, typically, can be evenly spaced around the stator and suitable corresponding additional driver circuits and a modified shaft encoder can be employed. Such a motor has the advantage of less torque ripple than that of the illustrated three phase motor 26.

The speed of the motor 26 and like motors can be controlled by either controlling the power delivered to the motor or by controlling the position of the shaft encoder signals relative to the stator. Each method can have many variations. Controlling the power to the motor may be implemented very simply, but such control may not necessarily produce the best efficiency over a wide speed range. Controlling the relative positions of the encoder signals may produce better efficiency, but may be more complex in circuit implementation for certain applications. In some applications, a combination of both methods may be useful.

Figure 6A:
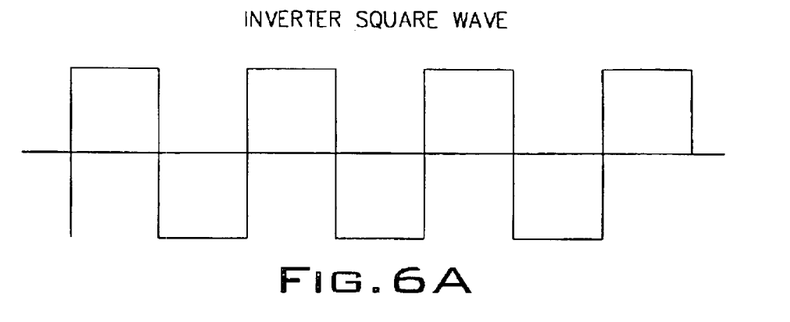
FIG. 6A is a diagram of square wave power available from an inverter illustrated in FIG. 7.
Figure 6B:
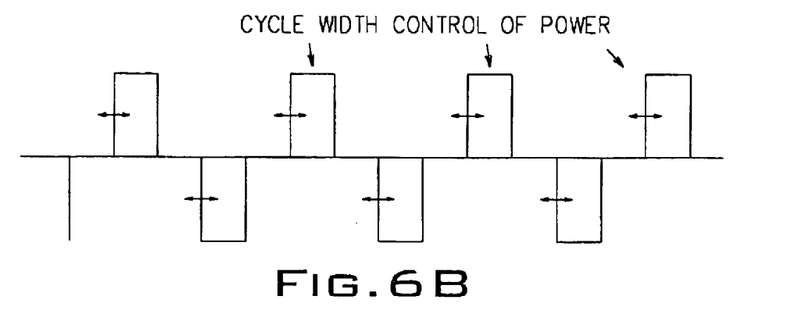
FIG. 6B is a diagram of a modified square wave power signal produced by the circuit of FIG. 7.
Figure 7:
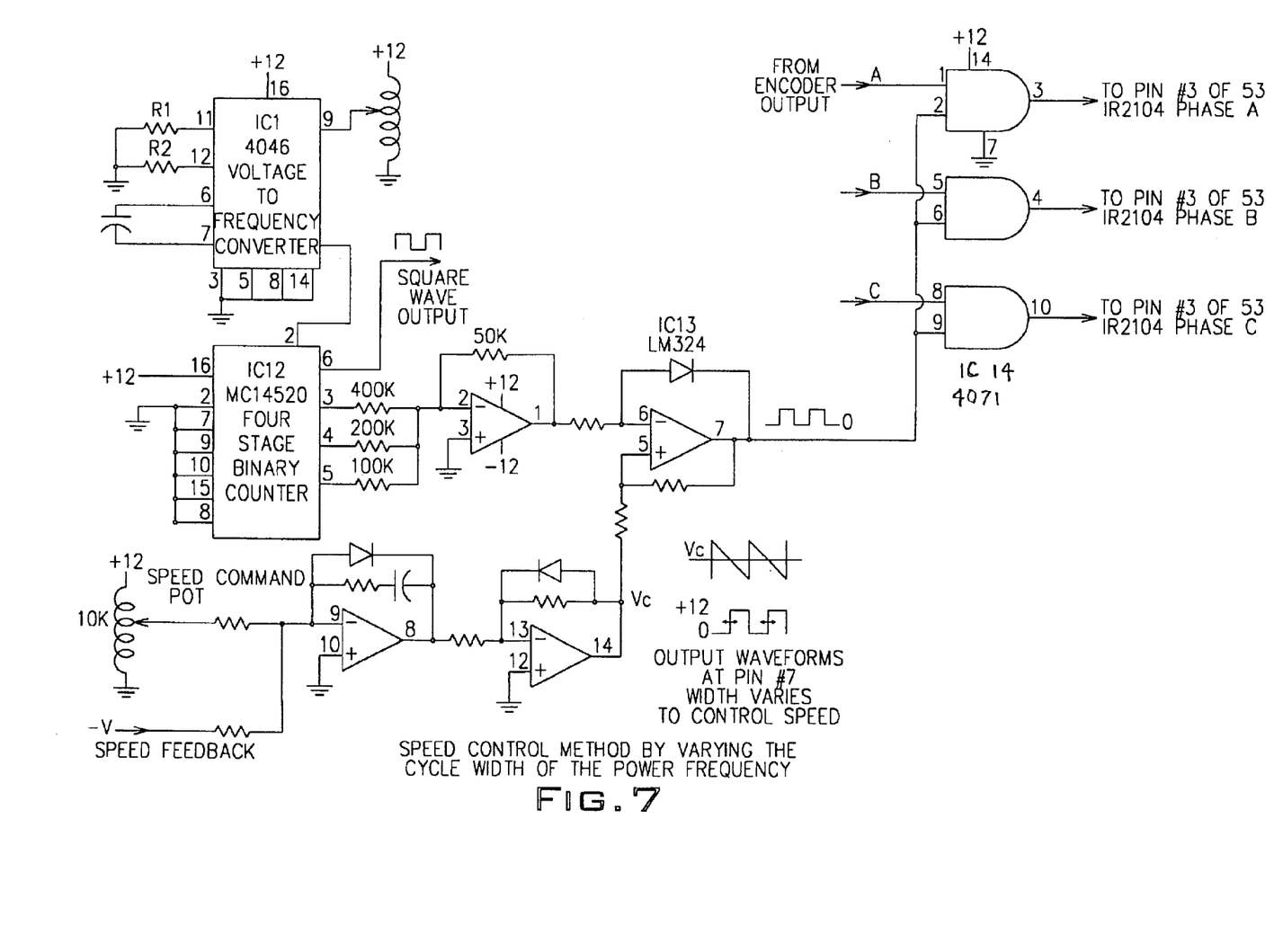
FIG. 7 is a circuit diagram for controlling the speed of the motor of FIG. 3.
Figure 8A:
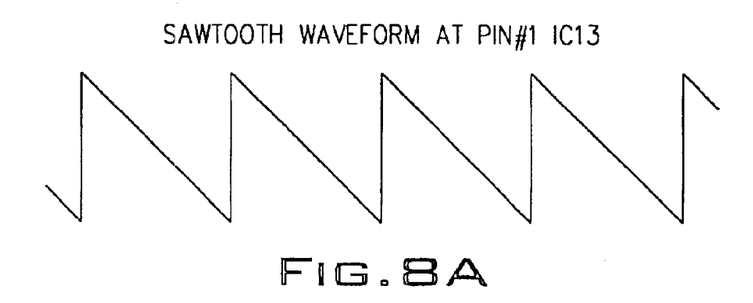
FIGS. 8A through 8D are diagrammatic representations of signals developed in the circuit of FIG. 7.
Figure 8B:
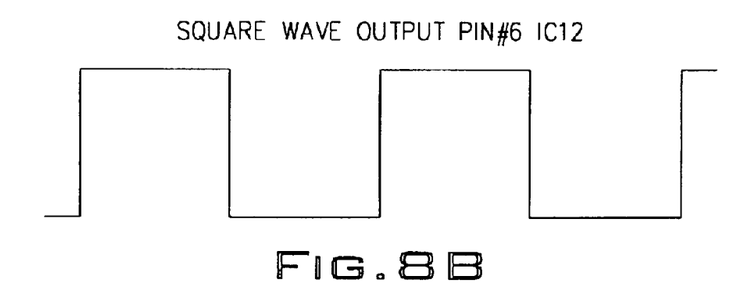

One way of controlling power for speed control is to control the width of each ½ cycle of a voltage square wave delivered to the motor. Full power of the square wave is applied when each half cycle occupies the total time of one half period as depicted in FIG. 6A. If the beginning of each half cycle is delayed by some fraction of the half period, as depicted in FIG. 6B, then the total amount of power delivered to the motor is reduced. The motor is not sensitive to waveform (does not need sine waves) so that only the total energy per half cycle is significant. There are many ways to implement this kind of control; a simple version is shown in FIG. 7. This circuit is used in conjunction with the circuit of FIG. 4. The frequency generator 54 is redrawn here. As will be understood from the following discussion, the circuit of FIG. 7 is interposed in the lines from the encoder 56 to the drives 53 for the field windings A, B and C. The frequency signal output of the frequency generator 54 is fed into pin 2 of IC 12 which is a four stage binary counter. Each stage divides the frequency by 2. At pin 6 of IC 12 (the output of the 4th stage), the frequency is ¹⁄₁₆ of the input at pin 2. The output frequency at pin 6 is fed into the driver stages 53 (at pin 2) of each power mosfet switch 51, 52 (FIG. 4) that delivers power to a particular stator winding phase or coil A, B or C. In this arrangement, the frequency generator 54 is typically set to a frequency that is 16 times greater than what is used in the original circuit in FIG. 4. The binary outputs from the other three stages are connected to a summing resistor network 61 at the input of an operational amplifier designated as IC 13 at pin 2. The output signal at pin 1 of IC 13 will appear as a sawtooth waveform and will be related to the square wave output on pin 6 of IC 12 as shown in FIGS. 8A and 8B, respectively.

Figure 8C:
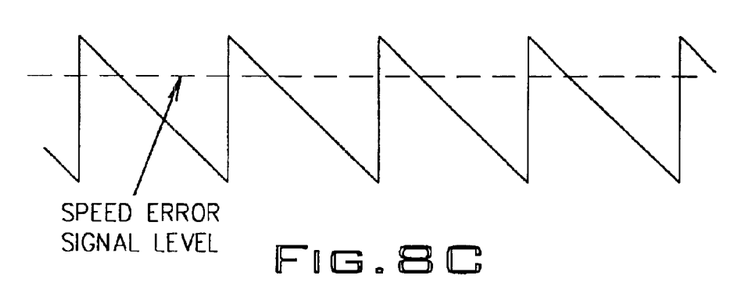
Figure 8D:
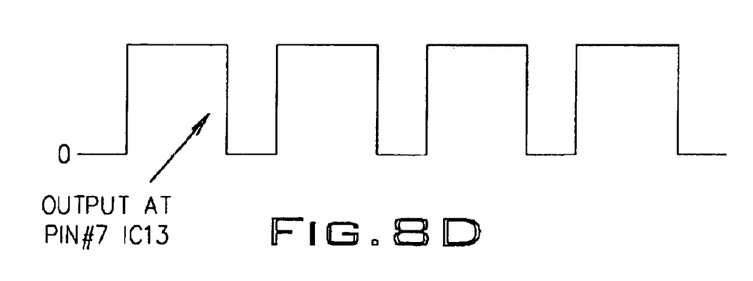

A speed command signal and a speed feedback signal (e.g. derived from the shaft encoder) are summed algebraically at pin 9 of IC 13 and the difference (speed error signal) is produced at pin 8 of IC 13. At pin 14 of IC 13 is the polarity inversion of the error signal. The error signal is then compared with the sawtooth waveform by the comparator circuit composed of pins 6, 5 and 7 of IC 13. With reference to FIG. 8C, when the magnitude of the error signal is below the sawtooth level, the output of pin 7 is 0; when the magnitude of the error signal is above the sawtooth level, the output of pin 7 is positive (a logic "1"). This output signal modulates the encoder signals that feed into the power mosfet drivers 53. In essence, the signal controls the turn on of each driver 53 at its pin 3. This is accomplished by dual input "and" gates shown as IC 14 (MC 14081B). Signals from the encoder 56 feed into one gate input and the signal from pin 7 of IC 13 feeds into the second gate input. The output of each gate IC 14 then feeds into the pin 3 of a respective driver 53. The result is a power signal applied to the motor field windings A, B or C as shown in FIG. 6D. As the speed error signal varies in magnitude, the width of each half cycle will vary in accordance. Where the power is supplied as a sine wave, such as from commercial power, a speed control circuit can be arranged to eliminate the beginning of each half cycle, typically in the manner an SCR is regularly used in like service.

Figure 9:
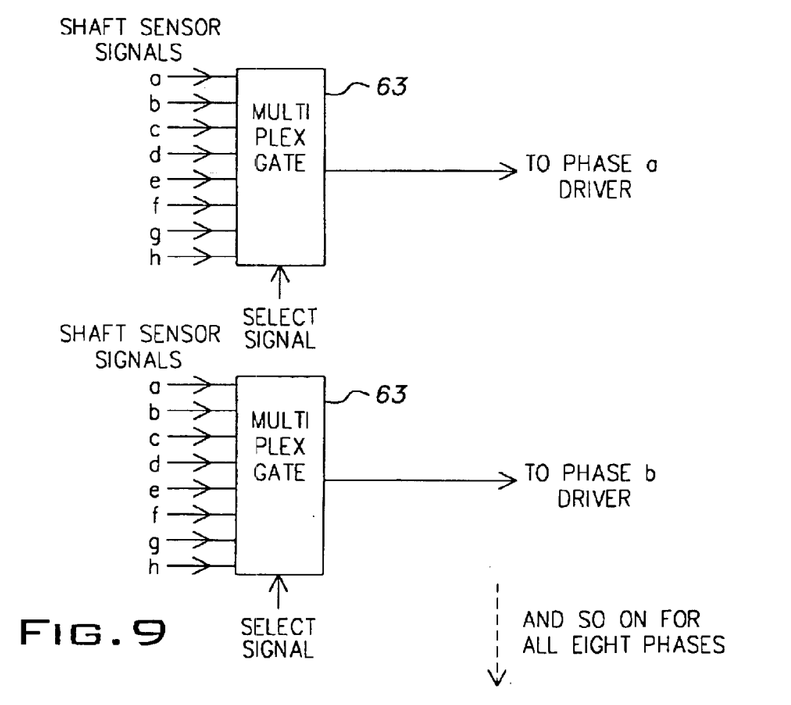
FIG. 9 is a diagrammatic illustration of a system for controlling the speed of a motor constructed in accordance with the invention.

The second method that can be used for speed control is to shift the encoder signals to different phase or winding drivers in accordance to the magnitude of the speed error signal. FIG. 9 illustrates circuitry to accomplish this. The select signal is derived from the speed control error signal.

Figure 10:
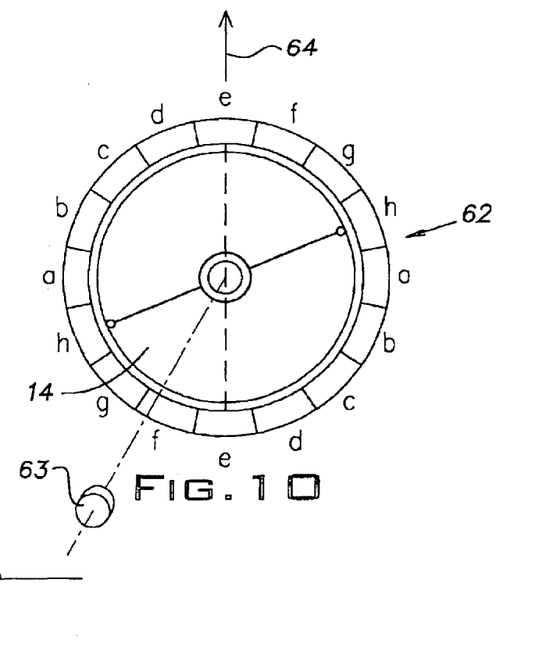
FIG. 10 is a schematic illustration of a motor arranged for speed control by the control system of FIG. 9.

A motor 62 schematically shown in FIG. 10 has eight field windings (a–h) and, accordingly, eight driver circuits (corresponding to elements 53, 51 and 52 in FIG. 4). The field windings a–h are like the windings A, B and C in FIG. 3. If a shaft position encoder or sensor 63 has its signals directed to turn on the field coils which produce the maximum torque, then the motor speed will increase to the point where the load torque is equal to the produced or developed motor torque. To reduce the torque and lower the speed, it is necessary to direct the signals of the position encoder 63 to different field coils. Speed control can thus be obtained by switching the encoder signals to different coils in response to the speed control error signal. The plane of the armature conductive loop 17 is shown in relationship to the field coil position labeled a–h. If coil a is energized, maximum torque is generated in the counter-clockwise direction. A magnetic field vector 64 of winding a is perpendicular to the plane of winding a. If field coil b were energized, a lesser torque would be created, and if field coil c were energized, an even lesser torque would be developed. By shifting the encoder connection to energize different coils, the torque is controlled. By using the speed error signal to determine the switching, the motor speed can be regulated. The speed error signal magnitude is compared to fixed signal voltage levels that are stepped by fixed increments. When the speed error exceeds each fixed level, a new connection arrangement is made between the encoder and the field coils. For example, with eight field coils, suppose that at the maximum level, encoder output A controls coil a and encoder B controls coil b, etc. Then, when the error signal drops to the next level, a logic switching action takes place in a multiplex gate 63 (FIG. 9) to connect encoder output A to coil b, and encoder output B to coil c, encoder C to coil d, etc. Then, when the error signal drops to the next level down (third level), the logic switching action connects encoder output A to coil c, and encoder output B to coil d, encoder output C to coil e, etc. Thus, the control acts to shift the position of the encoder signals in proportion to the magnitude of the error signal. This action will then increase or decrease torque and, accordingly, increase or decrease speed.

Figure 11:
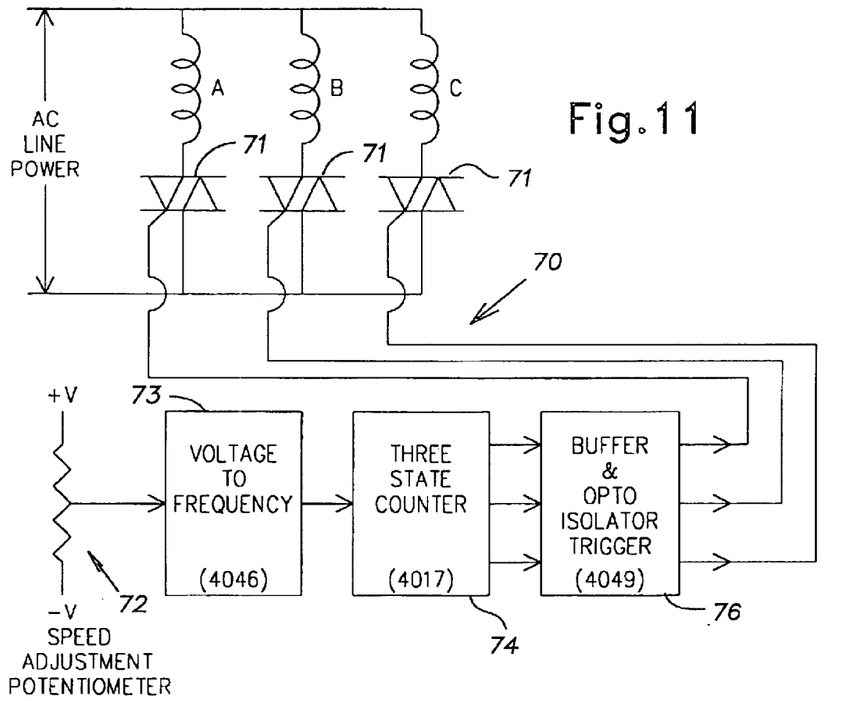
FIG. 11 is an alternative circuit for driving the motor of FIG. 3.

FIG. 11 shows an alternative controller or circuit 70, of simplified design, for operating the motor 26. Single phase alternating current power such as 110 volt 60 Hz commercial power is supplied to the windings A, B and C through corresponding triacs 71 or other electrically controllable switches. A frequency generator 73, (MCI 4046) produces a series of pulses having a frequency that is proportional to the voltage set by a potentiometer 72. The pulses are input to a counter 74 such as a CMOS 4017. The three outputs of the counter 74 are applied to sequentially fire the triacs 71 through a buffer 76 such as a CMOS 4049 inverting buffer that feeds the opto isolator trigger to each triac. The counter 74 assures that the windings or phases A, B and C are triggered sequentially at a rate corresponding to the frequency set by the voltage at the potentiometer 72. The motor 26, when operated by the circuit of FIG. 11, will run at a speed synchronous with the rate that the field windings A, B and C are triggered. The circuit 70 with the adjustable potentiometer 72 and variable frequency of the generator 73 thus provides a simple method of speed control for the motor 26. As this circuit 70 of FIG. 11 suggests, the motor 26 and others constructed like it in accordance with the invention can be operated directly off a commercial single phase power supply such as, for example, 120 volt 60 Hz power where high speed operation is not required. Conversely, this motor 26 and the circuit 70 can be supplied with a higher frequency power supply where it is desired to operate the motor at higher speeds. Innumerable other control systems and circuits are suitable for operating a motor constructed in accordance with the invention as will be apparent from an understanding of the present disclosure.

Figure 12:
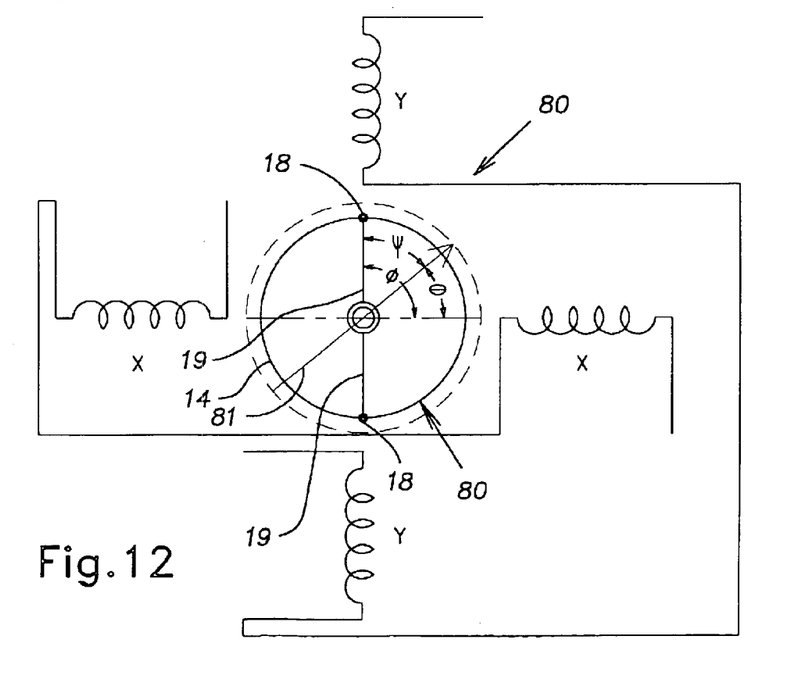
FIG. 12 is a schematic representation of a motor of the invention having field windings arranged in quadrature.

A flux vector drive is also contemplated for the motor of the invention. Referring to FIG. 12, a simple field winding configuration for a two winding two pole motor 80 is shown. Stator field or phase windings X, Y are physically located in quadrature and labeled X and Y to correspond with x and y axes. The windings X, Y create magnetic flux vectors along the corresponding x and y axes. Currents flowing through both sets of windings X and Y create a magnetic field flux vector 81 which is the vector sum of the individual magnetic flux vectors created by the currents in the separate windings X, Y. A vector angle Θ of the vector varies with respect to the X axis depending on respective magnitudes of the currents in windings X, Y.

The magnitudes of the AC currents in the windings X, Y are:

$I_X = \cos\Theta \sin 2\pi f_c t$; and $I_Y = \sin\Theta \sin 2\pi f_c t$;

where $f_c$ is the frequency of the current supplied, such as 60 Hz. The field flux vector 81 represents an alternating magnetic field with the frequency $f_c$. The field flux vector 81 can be positioned at any angle Θ by varying the currents in the field windings X, Y according to the following relationship:

$$\theta = \sin^{-1}\left(\frac{I_Y}{\sqrt{I_X^2 + I_Y^2}}\right)$$

The motor 80 has a rotor 14 like that described in connection with FIG. 1; the plane of the conductive loop 17 is displaced from the X axis by a rotor angle φ. The rotor 14 rotates synchronously at the speed that the field vector 81 is rotated. As discussed below, the field windings can be supplied with modulated AC currents from power amplifiers operated by a signal processor to appropriately rotate the magnetic field vector 81.

By creating and controlling a difference between the field flux vector angle Θ and the rotor angle φ, the torque output of the motor 80 can be controlled. That is, the torque is controlled by controlling the relative positions of the field flux vector and the plane of the conductive loop 17 on the rotor 14. As discussed previously with reference to FIG. 2, torque is developed when the rotor or armature 14 is located where there is an angular deflection ψ between the plane of the conductive loop 17 and the flux vector between the winding portions 12a, b; this torque varies with the magnitude of the angle ψ. Similarly, in FIG. 12, the torque varies with the difference between the flux vector angle Θ and the rotor angle φ. Note the relationship ψ=Θ−φ.

As previously discussed, the vector angle Θ is varied by varying the current amplitudes in the field windings X, Y. Since the currents are AC, the field currents will be suppressed carrier amplitude modulated sine waves that can be represented as:

$I_X = \cos(\omega_R t \pm \psi)\sin 2\pi f_c t$; and $I_Y = \sin(\omega_R t \pm \psi)\sin 2\pi f_c t$;

where $\omega_R$ is the rotational speed of the rotor 14. The angular deflection ψ with respect to the field flux vector is determined by the respective field currents $I_X$, $I_Y$ and the angular velocity $\omega_R$:

$$\pm\psi = \sin^{-1}\left(\frac{I_Y}{\sqrt{I_X^2 + I_Y^2}}\right) - \omega_R t$$

Referencing FIG. 2, the deflection angle ψ is varied to achieve the desired torque characteristics by varying the currents $I_X$, $I_Y$. The rotor position φ is sensed, for example, by a transducer or electrical parameters. Rotor position information is used to control the flux vector position Θ to maintain the desired deflection ψ and, therefore, the motor torque.

Figure 13:
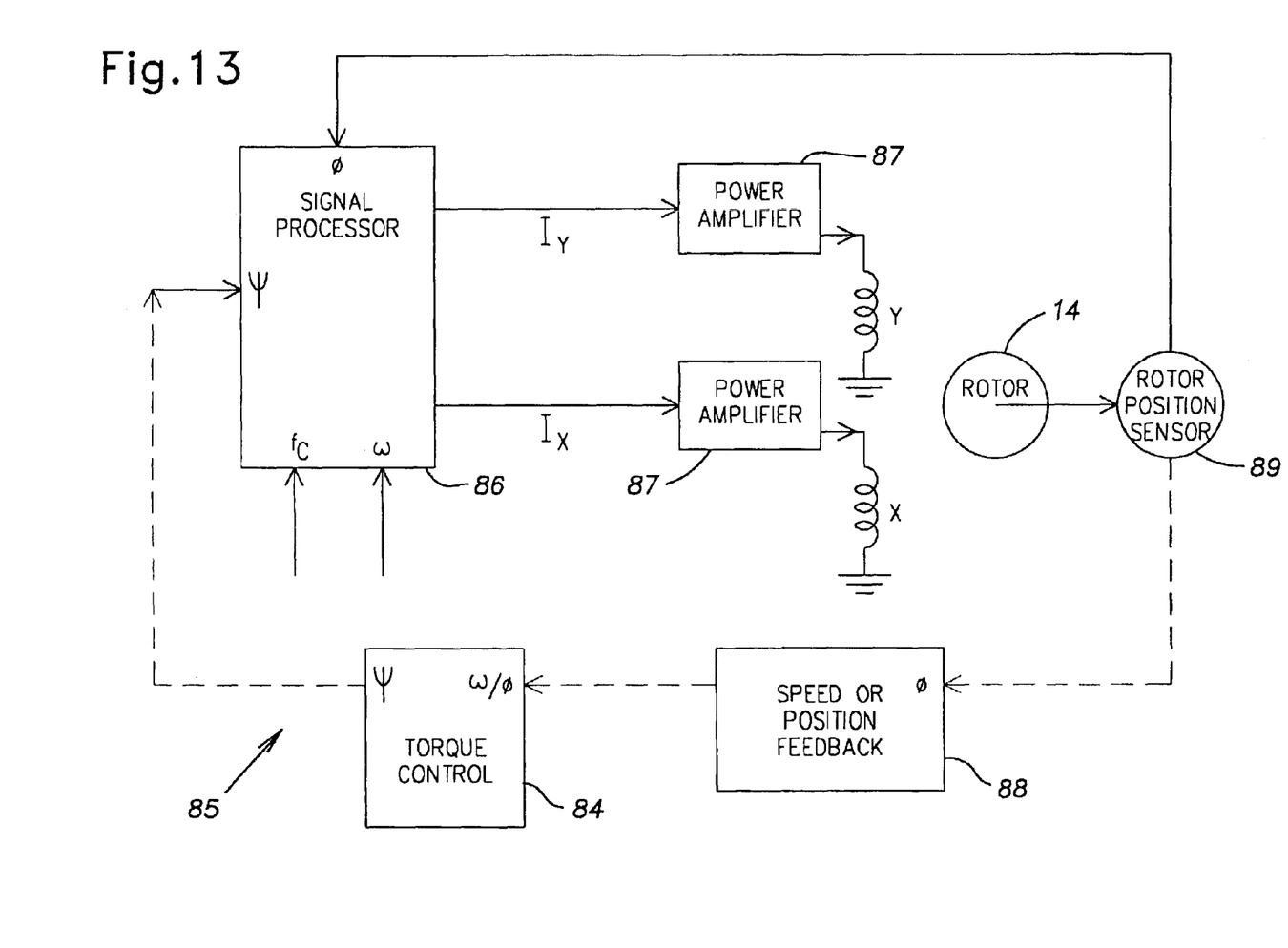
FIG. 13 is a circuit for driving the motor of FIG. 12.

A flux vector control circuit 85 that applies the foregoing principles and relationships of field current, field vector and rotor angle for torque control is shown in FIG. 13. The control 85 includes a signal processor 86 with two outputs for generating the currents $I_X$, $I_Y$. The currents are fed through respective power amplifiers 87 to the field windings X, Y. Frequency $F_c$, is set by a suitable frequency input. A rotor position sensor 89, such as a numerical shaft position sensor, provides rotor position information data to the signal processor 86. A torque command input, corresponding to a deflection angle ψ is provided to the signal processor to control torque. The signal processor 86 in accordance with the foregoing formulas generates the currents $I_X$, $I_Y$ as functions of the frequency $F_c$, rotor position $\phi$ (which indicates rotor speed $\omega_R$), and torque command deflection angle $\psi$ to control the torque characteristics of the motor 80. The speed of the motor is controlled according to the rate $\omega$ at which the carrier signal is modulated, which can be selected by a speed input. The rotor position sensor can be connected to provide speed or position feedback, diagrammatically represented at 88, through a torque control 84 to control the torque command angle setting $\psi$.

Figure 14:
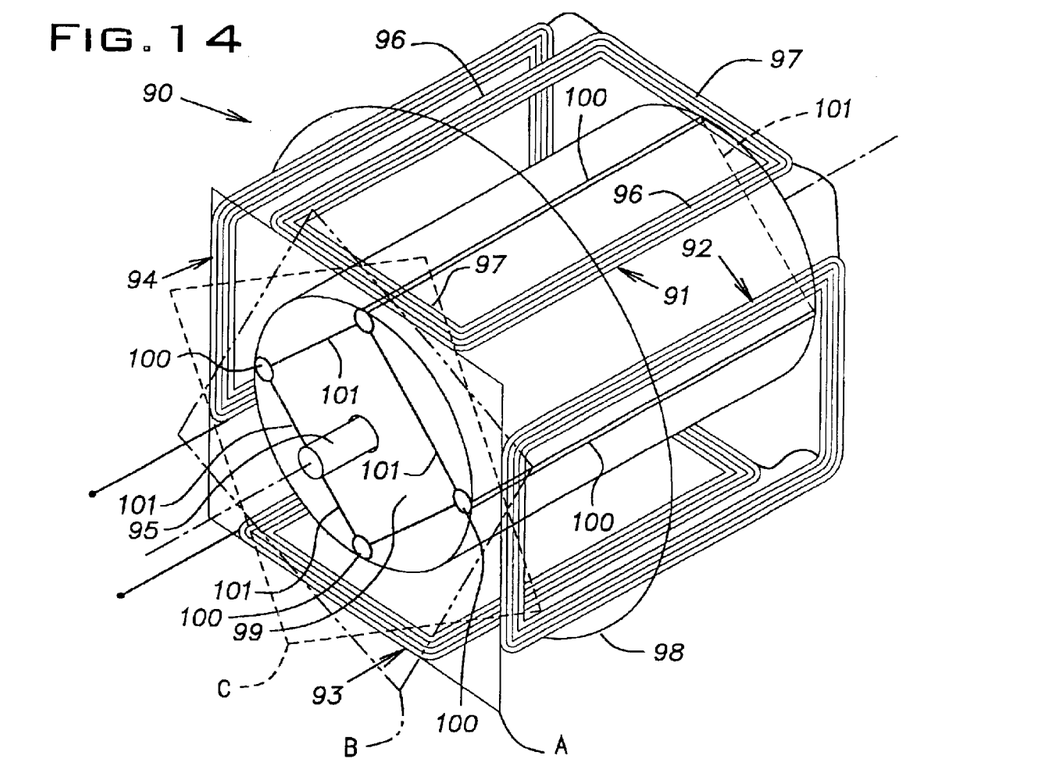
FIG. 14 is a schematic perspective view of a four pole three-phase motor constructed in accordance with the invention.
Figure 15:
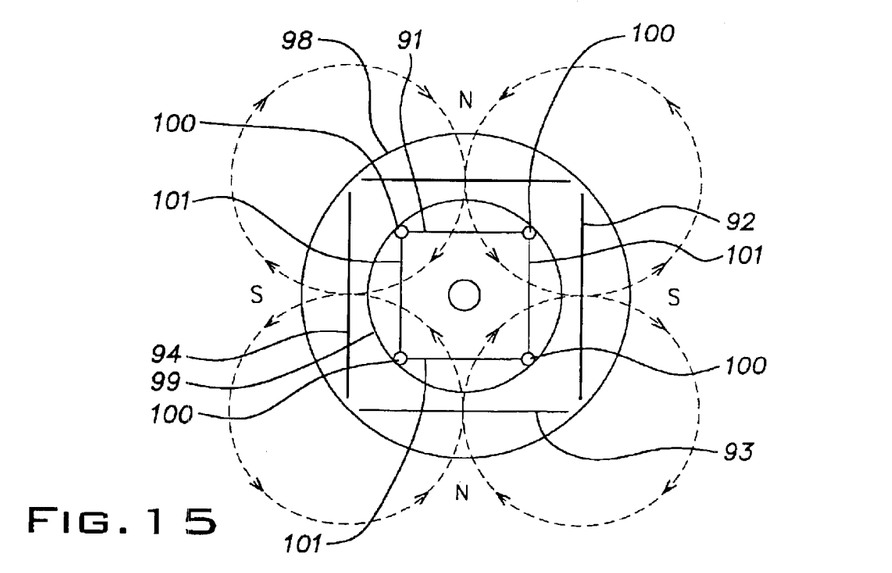
FIG. 15 is a diagrammatic illustration of the field vectors of one of the windings of the motor of FIG. 14.

A motor constructed in accordance with the invention can be made with four poles as schematically shown in FIG. 14. The motor 90 can develop twice the torque of a similarly sized two pole motor such as the motor 26 in FIG. 3. The illustrated motor 90 has three field winding phases designated Phase A, Phase B and Phase C. Each Phase A, B and C has f our coils 91, 92, 93, and 94. Each of these coils has a pair of spaced axially extending portions 96 and a pair of end turn portions 97, one at each end of a stator typically of suitable laminations represented by the circular line 98. The coils 91, 92, 93 and 94 are connected in series with alternate coils wound in a clockwise direction and intervening coils wound in counter-clockwise direction. Alternatively, the coils 91–94 can be connected in parallel. For clarity, the coils 91–94 of only one phase (A) is shown, it being understood that the other phases B and C are identical. A rotor 99 of the motor 90 has four conductive wires or rods 100 equally spaced around the circumference of the rotor 99 and extending longitudinally of the rotor. The conductors 100 are interconnected or shunted by end wires or conductors 101 at each end of each conductor 100. The longitudinal conductors 100, like the conductors 17 of the rotor 14 of FIG. 3, are parallel with the axis of rotation of the rotor 99 on a shaft 95. The rotor 99 and stator 98 typically include bodies formed of silicon steel laminations as previously described. The windings of Phases A, B and C can be energized by a circuit like that shown in FIG. 4 or 11. Motors having a greater even number of poles such as 6, 8 or more, can be constructed similarly to the four pole motor of FIG. 14 and such motors will have a proportionately higher torque capacity.

As will be understood from the foregoing disclosure, the motor of the invention can take various forms and can be powered by innumerable electrical circuit arrangements, both open and closed loop. Switches for the field windings can include triacs, transistors, silicon controlled rectifiers (SCR's) and magnetic amplifiers, for example. The rotor, rather than having a conductive loop to present a variable reluctance to the stator field, can be formed with a diametrically disposed air gap (FIG. 16) or a conductive plate (FIG. 17) in the plane otherwise occupied by the conductive rotor loop.

Figure 16:
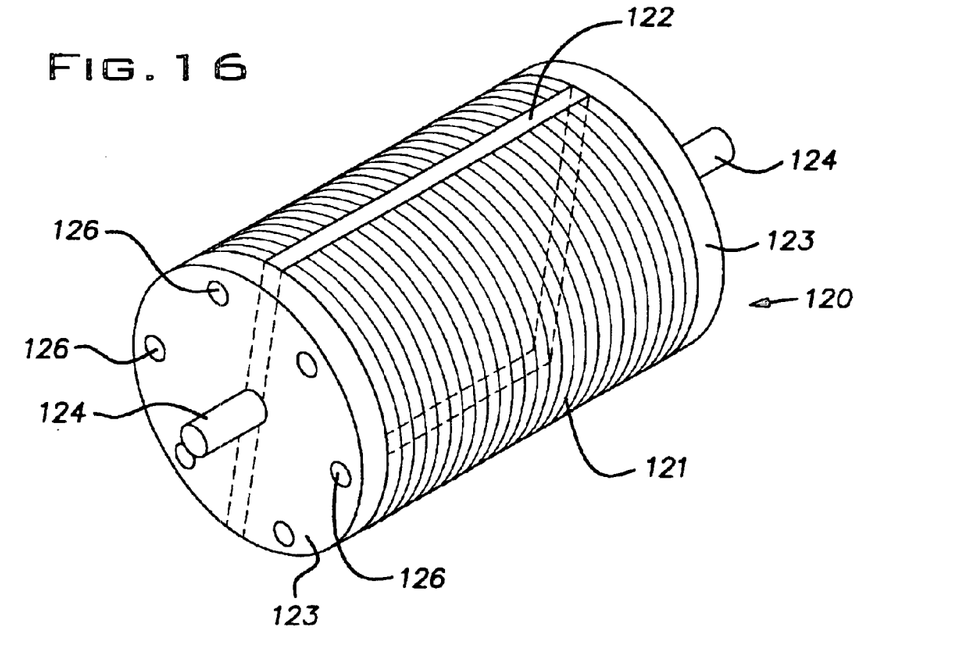
FIG. 16 is a diagrammatic representation of a rotor for use in the motor of the invention in accordance with a second embodiment.

In the embodiment of FIG. 16, a rotor is diagrammatically illustrated at 120. The rotor 120 includes a stack of laminations 121 of magnetic silicon steel. The laminations 121 can be "D" shaped elements arranged on opposite sides of a diametral air gap 122. Non-magnetic end plates 123 with integral co-axial stub shafts 124 are held in the illustrated assembled configuration with tension rods 126 that are preferably non-magnetic. Various other arrangements for supporting the magnetic rotor halves or portions on the shaft elements or their equivalent are envisioned. This rotor with a suitable shaft encoder can be used in the general types of stators illustrated in FIGS. 3, 10 and 12. The reluctance of the air gap 122 enables the rotor to follow the rotation of the field of the stator. A motor employing the rotor 122 has the potential of high efficiency since there is no substantial $I^2R$ loss developed by induced currents in the rotor.

Figure 17:
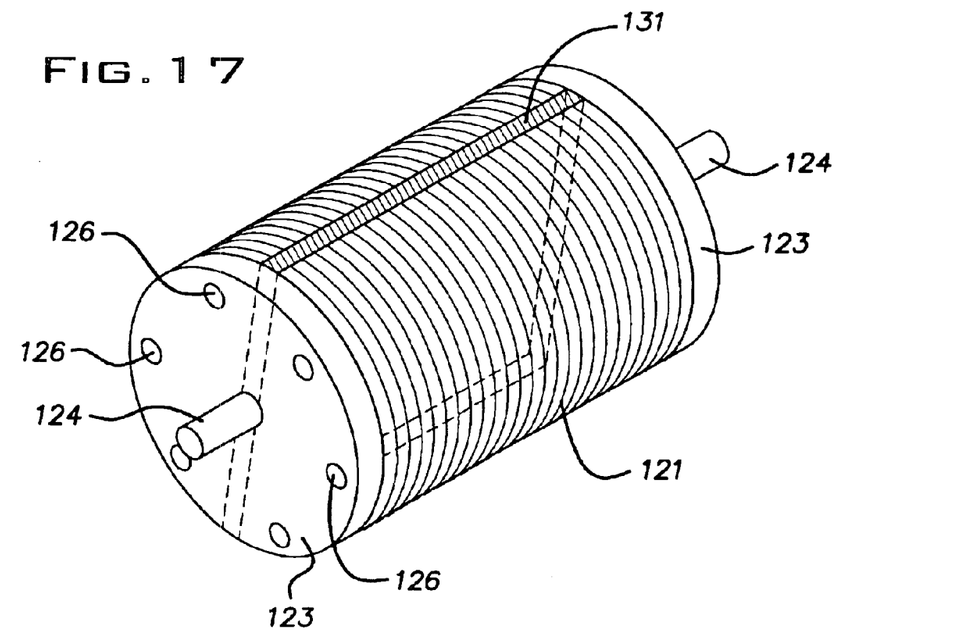
FIG. 17 is a diagrammatic representation of a rotor for use in the motor of the invention in accordance with a third embodiment.

FIG. 17 illustrates an embodiment of a rotor 130 similar to that of FIG. 16 (using identical reference numerals for like parts) except that the air gap is filled with an electrically conductive plate or body 131. As before, a suitable shaft encoder can be employed. The motor can be used with the stators of FIGS. 3, 10 and 12. The rotor 130 has the potential of producing a relatively high torque because of the high magnetomotive force that induced currents in the plate 131 can produce.

The rotor can be disposed around, rather than in, the stator. The conductive loop or loops on the rotor can be skewed in a helical or like sense to reduce torque ripple. The number of field windings and related electronic switches, also, can be increased to decrease torque ripple. Some of the turns of a particular winding can share the same stator lamination slot or angular position as some of the winding turns of an adjacent winding.

The motor can be supplied with a shaft encoder and appropriate circuitry for operation as a stepping motor and is especially suitable for large size stepping motors. A desired angular resolution for a stepping motor application can be achieved by providing a suitable number of field windings. As previously discussed herein, the rotor will seek to align the plane of the conductive loop, or equivalent structure, to the magnetic field vector of a particular winding that is energized. The motor is reversible simply by reversing the sequence that the field windings are energized by the related circuitry.

A circuit powering the field windings of the motor can energize more than one field winding at a time to reduce torque ripple and/or the circuit can be arranged to modulate power to the windings rather than simply turning them on and off. Field windings on the stator can have various configurations besides those illustrated in FIGS. 1, 3 and 14, it being important that the winding arrangement be capable of producing an AC magnetic field in the space of the rotor that moves around the axis of the rotor.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. An electric motor comprising a stator and a rotor, field windings on the stator for producing an AC magnetic field with a vector at successive angular positions around the axis of rotation of the motor when the windings are successively energized with single phase AC power, the rotor having a construction by which it increases the reluctance in the magnetic field when it has an angular orientation out of alignment with the magnetic field vector compared to its reluctance when it is aligned with the magnetic field vector whereby the rotor seeks to rotate in synchronization with the magnetic field vector produced by the field windings, the rotor construction having a diametral high reluctance area and relatively low reluctance areas on opposite sides of said diametral area.

2. An electric motor as set forth in claim 1, wherein said high reluctance area includes an air gap.

3. An electric motor as set forth in claim 2, wherein said air gap extends uninterrupted across the diameter of the rotor.

4. An electric motor as set forth in claim 3, wherein an electrically conductive non-magnetic body is disposed substantially throughout said air gap.

5. A controller for a single phase AC motor comprising a circuit for receiving a signal from a sensor for sensing the rotation of the rotor of the motor, a plurality of switches and/or amplifiers that each deliver AC electrical power at its respective output for an associated coil of the motor, the electrical power at each output having an AC frequency common with the electrical power AC frequency at the other outputs, the AC electrical power at each output varying in amplitude in a cyclic manner from a value of zero to a maximum value during each revolution of the rotor of the motor.

6. A controller as set forth in claim 5, wherein the controller has two outputs, each output being adapted to drive one of a pair of two motor stator windings, X and Y, arranged physically in quadrature with the magnitude of the AC currents being $$I_X = \cos \Theta \sin 2\pi f_c t; \text{ and}$$

$$I_Y = \sin \Theta \sin 2\pi f_c t;$$

where $f_c$ is the frequency of the supplied current.

7. A controller as set forth in claim 5, having at least three outputs, said controller being arranged to deliver AC power to each of said outputs on a uniform, sequentially timed basis during each revolution of the rotor of the motor.

* * * * *